United States Patent
Wichlund et al.

(10) Patent No.: US 9,729,366 B2
(45) Date of Patent: Aug. 8, 2017

(54) DIGITAL RADIO TRANSMISSIONS

(71) Applicant: NORDIC SEMICONDUCTOR ASA, Trondheim (NO)

(72) Inventors: Sverre Wichlund, Trondheim (NO); Eivind Sjogren Olsen, Trondheim (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 0 days.

(21) Appl. No.: 14/783,806

(22) PCT Filed: Apr. 9, 2014

(86) PCT No.: PCT/GB2014/051098
§ 371 (c)(1),
(2) Date: Oct. 9, 2015

(87) PCT Pub. No.: WO2014/167318
PCT Pub. Date: Oct. 16, 2014

(65) Prior Publication Data
US 2016/0072652 A1    Mar. 10, 2016

(30) Foreign Application Priority Data

Apr. 12, 2013  (GB) .................................. 1306694.9

(51) Int. Cl.
*H04L 27/233*  (2006.01)
*H04L 27/00*   (2006.01)

(52) U.S. Cl.
CPC ...... *H04L 27/2334* (2013.01); *H04L 27/2332* (2013.01); *H04L 2027/003* (2013.01);
(Continued)

(58) Field of Classification Search
CPC ..... H04L 2027/0065; H04L 2027/0085; H04L 27/2334
See application file for complete search history.

(56) References Cited

U.S. PATENT DOCUMENTS

| 5,239,585 A | 8/1993 | Restle |
| 2007/0268978 A1* | 11/2007 | Kazakevich ........ H04L 27/2332 375/261 |
| 2009/0067562 A1 | 3/2009 | Laurent |

FOREIGN PATENT DOCUMENTS

WO      WO 99/62215       12/1999

OTHER PUBLICATIONS

Tibenderana C et al: "A low-cost scalable matched filter bank receiver for GFSK signals with carrier frequency and modulation index offset compensation", Conference Record of the 38r Asilomar Conference on Signals, Systems and Computers, 2004, Held in Pacific Grove, CA USA, vol. 1 / Nov. 7, 2004 (Nov. 7, 2004), pp. 682-686.*

(Continued)

*Primary Examiner* — Ross Varndell
(74) *Attorney, Agent, or Firm* — Koppel, Patrick, Heybl & Philpott

(57) ABSTRACT

A digital radio receiver adapted to receive radio signals modulated using continuous phase frequency shift keying, CPFSK. The receiver comprises means for receiving a radio signal (2), a correlator (8) arranged to estimate a frequency offset between the carrier frequency of the received radio signal and a nominal carrier frequency, means for correcting said frequency offset (4) and outputting a frequency-corrected radio signal (6), and a matched filter bank, MFB, which comprises a plurality of filters (20,22), each of which corresponds to a different bit pattern, for determining a bit sequence (36) from the frequency-corrected radio signal (6).

16 Claims, 2 Drawing Sheets

Figure 1:
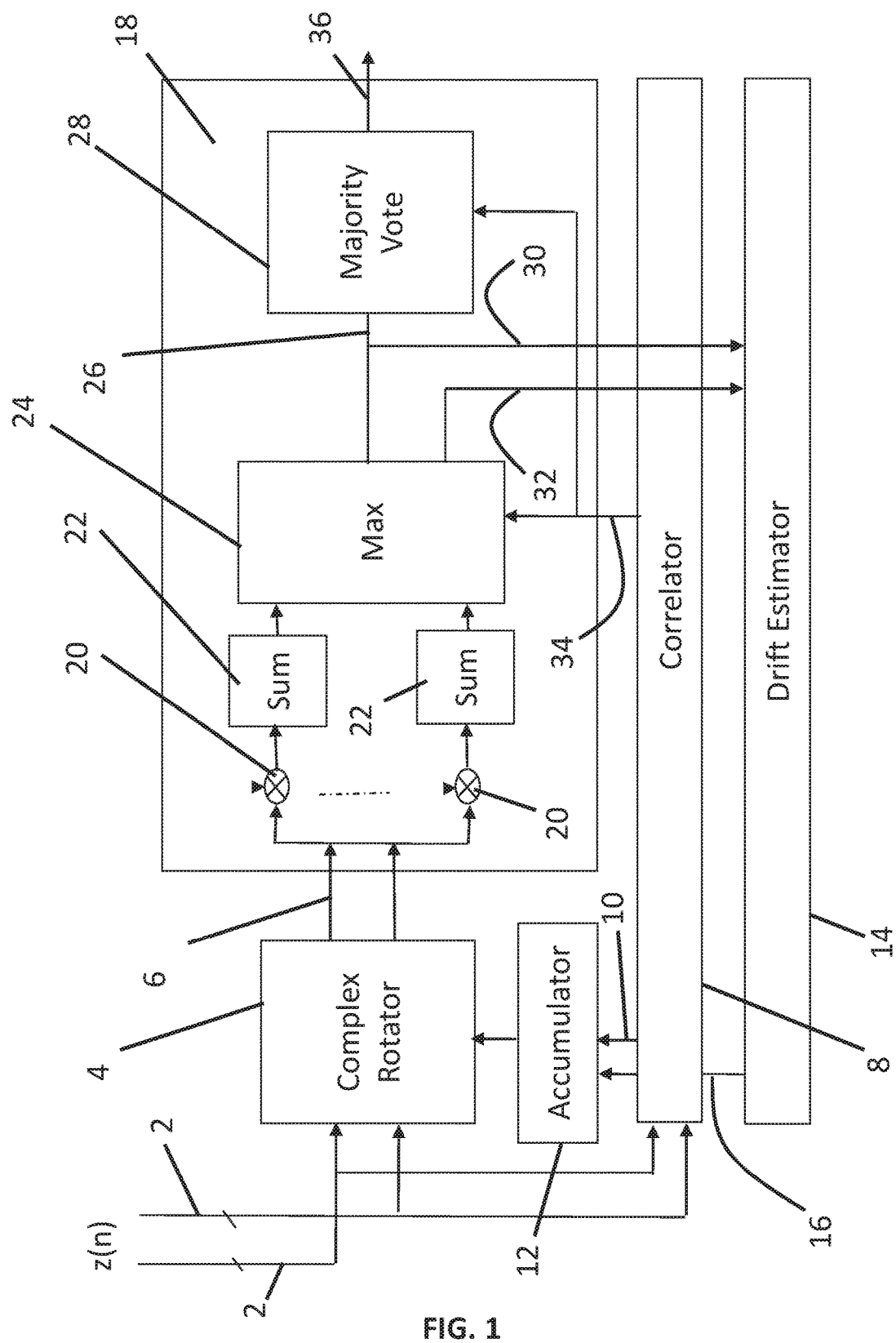

(52) U.S. Cl.
CPC ............... *H04L 2027/0057* (2013.01); *H04L 2027/0065* (2013.01); *H04L 2027/0085* (2013.01); *H04L 2027/0095* (2013.01)

(56) References Cited

OTHER PUBLICATIONS

Heinrich Meyr et al: "Digital Communication Receivers: Synchronization, Channel Estimation, and Signal Processing—Chapter 8: Frequency Estimation" In: 1998, Wiley-Interscience Publication, XP055121272, ISBN: 978-0-47-120057-4 pp. 445-504, cited in the application A sections 8.4.3 and 8.4.4; figure 8-24.*

Notification of Transmittal of the International Search Report (PCT/ISA/220; PCT/ISA/210) and the Written Opinion of the International Searching Authority for PCT/GB2014/051098 dated Oct. 9, 2014.

Correspondence and Search Report from UK Intellectual Property Office for GB1306694.9 dated Oct. 17, 2013.

Invitation to Pay Additional Fees, and Protest Fees (PCT/ISA/206) and Annex to Form PCT/ISA/206 Communication Relating to the Results of the Partial International Search for PCT/GB2014/051098 dated Jun. 13, 2014.

Tibenderana C et al: "A low-cost scalable matched filter bank receiver for GFSK signals with carrier frequency and modulation index offset compensation", Conference Record of the 38th Asilomar Conference on Signals, Systems and Computers, 2004, Held in Pacific Grove, CA USA, vol. 1/ Nov. 7, 2004 (Nov. 7, 2004), pp. 682-686, XP010779661, Piscataway, NJ, USA DOI: 10.1109/ACSSC.2004.1399221 ISBN: 978-0-7803-8622-8 Y sections 2, 3, 4.1; figure 3.

Heinrich Meyr et al: "Digital Communication Receivers: Synchronization, Channel Estimation, and Signal Processing—Chapter 8: Frequency Estimation" In:1998, Wiley-Interscience Publication, XP055121272, ISBN: 978-0-47-120057-4 pp. 445-504, cited in the application A sections 8.4.3 and 8.4.4; figure 8-24.

International Preliminary Report on Patentability from corresponding appl. No. PCT/GB2014/051098, dated Oct. 22, 2015.

* cited by examiner

DIGITAL RADIO TRANSMISSIONS

This invention relates to methods and apparatus for decoding digital radio transmissions.

In digital radio communication it is necessary to convert the incoming analogue waveform into a sequence of discrete bits. Typically the baseband processing part of the receiving radio receives two baseband signals known as in-phase (I) and quadrature (Q) signals. Theoretically the Q signal is 90 degrees out of phase with the I signal. These signals can be viewed as occupying points around a unit circle in the complex plane.

In known arrangements (e.g. so called discriminator detectors) the baseband signals are taken and the phase angle between them computed and differentiated to produce a 'real' waveform. This waveform is used to deduce the sequence of bits which is to be output for digital processing.

One known method for deducing a bit sequence from the received waveform is to apply a matched filter bank to the waveform. This comprises a series of filters each of which matches the waveform corresponding to one or more bits. For example in a bank of eight filters each filter would correspond to a different waveform representing a sequence of three bits. Bit decisions are then made in blocks of three depending on which filter gives the strongest match to a given part of the waveform. This approach can be said to be near optimum (assuming additive white Gaussian noise) non-coherent maximum likelihood estimation of a bit based on a bank of matched filters over an observation of, in the example above, three bits length.

The matched filter bank approach can give good results in theory. However the Applicant has appreciated that in practice it is not very tolerant of carrier frequency drift and offset which are inevitable features of real-world radio communications.

The present invention aims to address this issue and when viewed from a first aspect it provides a digital radio receiver adapted to receive radio signals modulated using continuous phase frequency shift keying, the receiver comprising means for receiving an analogue radio signal having a carrier frequency, a correlator arranged to estimate a frequency offset between said carrier frequency and a nominal carrier frequency, means for correcting for said frequency offset and a matched filter bank comprising a plurality of filters each of which corresponds to a different bit pattern for determining a bit sequence from said analogue signal.

Thus it will be seen by those skilled in the art that in accordance with the invention a correlator is used to estimate the carrier frequency offset before the matched filter bank (MFB) is applied. This allows frequency offset correction to be applied and so enhances the reliability of the MFB. As will be familiar to those skilled in the art, the correlator may be used to compute a cross-correlation between an incoming waveform and a known waveform which represents some synchronization bits in the data packet. The Applicant has discovered that using a correlator to estimate frequency offset is particularly advantageous when used in conjunction with an MFB. First is the fact that correlators are able to operate relatively fast since it is not necessary to carry out a search or learning type of operation. Second is that since correlators can provide estimates of timing as well as of frequency offset, rapid timing synchronization can be achieved which is advantageous in applications such as Bluetooth where there is limited time allowed in the protocol for synchronization. Third is that the correlator can also work as a packet detector since a valid 'peak' at the correlator output can also act as valid packet (frame) synchronization. Fourth is that it has been found that a suitably designed correlator may work satisfactorily under low signal-to-noise ratios (SNRs), i.e. the correlator does not become a limiting factor.

In a set of embodiments the correlator is a Joint Frame and Frequency offset data-aided estimator.

Although being able to estimate and correct for frequency offset allows the MFB to be applied more reliably, the Applicant has further realised that this reliability can also be hampered by frequency drift—that is a change in the frequency offset over time—i.e. over the duration of a data packet. Thus in a set of embodiments the receiver comprises a module arranged to estimate a frequency drift in said carrier signal. The Applicant has devised a particularly advantageous arrangement for estimating frequency drift of an incoming signal when a matched filter bank is employed which is to use a plurality of observations of phase information relating to the incoming signal provided by the matched filter bank to estimate the frequency drift. More particularly the receiver in such embodiments is arranged to estimate phase drift by comparing the phase determined by a given filter of the MFB when it is the matched filter with the phase determined on a subsequent matching occasion after a period in which there are an equal number of high and low bits received. The latter requirement removes the effect of modulation on the phase and thus the residual phase shift over this period can be attributed to the frequency drift.

Such an arrangement is novel and inventive in its own right and thus when viewed from a second aspect the invention provides a digital radio receiver adapted to receive radio signals having a carrier frequency and modulated using continuous phase frequency shift keying, the receiver comprising means for receiving said radio signal, and a matched filter bank comprising a plurality of filters each of which corresponds to a different bit pattern for determining a bit sequence from said signal, wherein the receiver is arranged to obtain information from one of said filters relating to a phase of said signal when said filter is matched to a bit pattern on a first occasion; obtain information from said filter relating to a phase of said signal when said filter is matched to a bit pattern on a second occasion; and estimate a frequency drift of said carrier frequency using a difference in phase between the phase determined on the first occasion and the phase determined on the second occasion if said bit sequence between said first and second occasions comprises an equal number of high and low bits.

This aspect of the invention extends to a method of estimating a frequency drift in a radio signal modulated using continuous phase frequency shift keying, the method comprising:

receiving said radio signal having a carrier frequency;
determining a bit sequence from said radio signal using a matched filter bank comprising a plurality of filters each of which corresponds to a different bit pattern;
obtaining information from one of said filters relating to a phase of said signal when said filter is matched to a bit pattern on a first occasion; obtaining information from said filter relating to a phase of said signal when said filter is matched to a bit pattern on a second occasion; and estimating a frequency drift of said carrier frequency using a difference in phase between the phase determined on the first occasion and the phase determined on the second occasion if said bit sequence between said first and second occasions comprises an equal number of high and low bits.

Preferably the receiver is arranged to apply a correction to said carrier frequency based on said drift estimate.

The phase may be obtained by computing the arctan of the complex filter output. The arctan may be computed using the well-known coordinate rotation digital computer (CORDIC) algorithm.

The phase may be measured for only one or a subset of the filters of the MFB, but preferably any of them can be used for phase measurement. This allows the drift estimate to be made more often. Similarly it is not essential, but is preferred, to make a frequency drift estimate each time a filter is matched and there is a parity of bits.

If the bit sequence between the first and second occasion does not comprise an equal number of high and low bits the phase comparison may be made between the second match occasion and a later match occasion in order to achieve such parity.

In the preferred embodiment the phase is recorded with a timestamp each time a filter is matched and then the next time that filter is matched a check is made to see whether an equal number of high and low bits has been identified since the previous check. If so, the difference in phase may be used to estimate the frequency drift (along with the difference in timestamps between the matches).

In a set of embodiments a threshold time for said period is defined such that no drift estimate is made if said threshold time is exceeded. This reduces the risk of 'wraparound' whereby there is a phase shift of more than one full cycle during the period—i.e. between successive matches by the filter. The threshold time could be fixed or determined dynamically based one or more previous estimates of the frequency drift.

In a set of embodiments a maximum frequency drift estimate is set such that if an estimate greater than the maximum is made it is disregarded. This ensures that an estimate which is 'unsafe' is not used. This could arise, for example, where a non-ideal index transition occurs.

In a set of embodiments a minimum frequency drift is set below which no correction is made for the sake of computational efficiency. In a set of embodiments a minimum time threshold is set such that no correction is made if the time since the last correction is below this threshold.

In accordance with the aspects of the invention set out above an MFB is used to determine the sequence of bits in a signal by matching sequence sections with specific filters. For example where 3 bit filters are used a bank of eight filters is used to correspond to the eight possible 3 bit sequences. The conventional use of such filter banks is therefore to look for the closest-match filter for each block of 3 bits. Of course other filter lengths can be used—e.g. 5 or 7 bits. However the Applicant has devised an improved implementation of an MFB which exploits the Applicant's recognition that for each individual bit there are multiple observations of the bit with the number of observations corresponding to the filter length. Taking the number of bits per filter as K, the number of filters in the bank is $2^K$. Rather than making a bit decision as soon as possible, in accordance with a set of embodiments the K most recent bit observations of each bit are used to make a bit decision. In theory each observation should be consistent. However in a practical implementation the impact of noise means that they may not all agree. Where only a single observation is used to make a bit determination, this could lead to a bit error. However where multiple observations are used the most common determination can be used. This effectively allows each matching filter to 'vote' for the assignation of a given bit and the 'majority' vote can be used. Such an approach is more robust in the presence of noise than the standard implementation of MFBs.

Such an approach is novel and inventive in its own right and thus when viewed from a further aspect the invention provides a method of decoding a digitally encoded radio signal comprising:

a) receiving said radio signal;
b) for each bit period:
   i) applying a bank of matched filters to said signal, wherein said filters have a length of K bits; and
   ii) determining and recording which one of said matched filters gives a best match to the signal for the bit period and the preceding K−1 bit periods; and
c) determining an output bit value on the basis of the bit values indicated by the majority of K matched filters where K is an odd number or K−1 filters where K is an even number.

The invention extends to a digital radio receiver arranged to carry out the aforementioned method.

In accordance with this aspect of the invention a bit value could be estimated from each matched filter thereby yielding K bit value estimates for each bit period. The output bit value may then be determined on the basis of the majority of such estimates. However it is presently preferred to determine the output bit directly from the K recorded filter indices which cover the relevant bit period.

The value of K, the number of bits per filter may be selected according to the particular implementation. In general the higher the value of K the greater the accuracy of bit determination but also the greater the complexity of the matched filter bank. In a set of embodiments a value of K=3 is used—i.e. the matched filter bank comprises eight 3 bit filters. The Applicant has found that by employing the 'majority vote' approach outlined hereinabove results approaching those observed with 5 bit filters can be achieved but without the attendant complexity. In other words for a given bit error rate (BER) a signal to noise ratio approaching that which is sufficient when a K=5 MFB is used can be tolerated.

Figure 2:
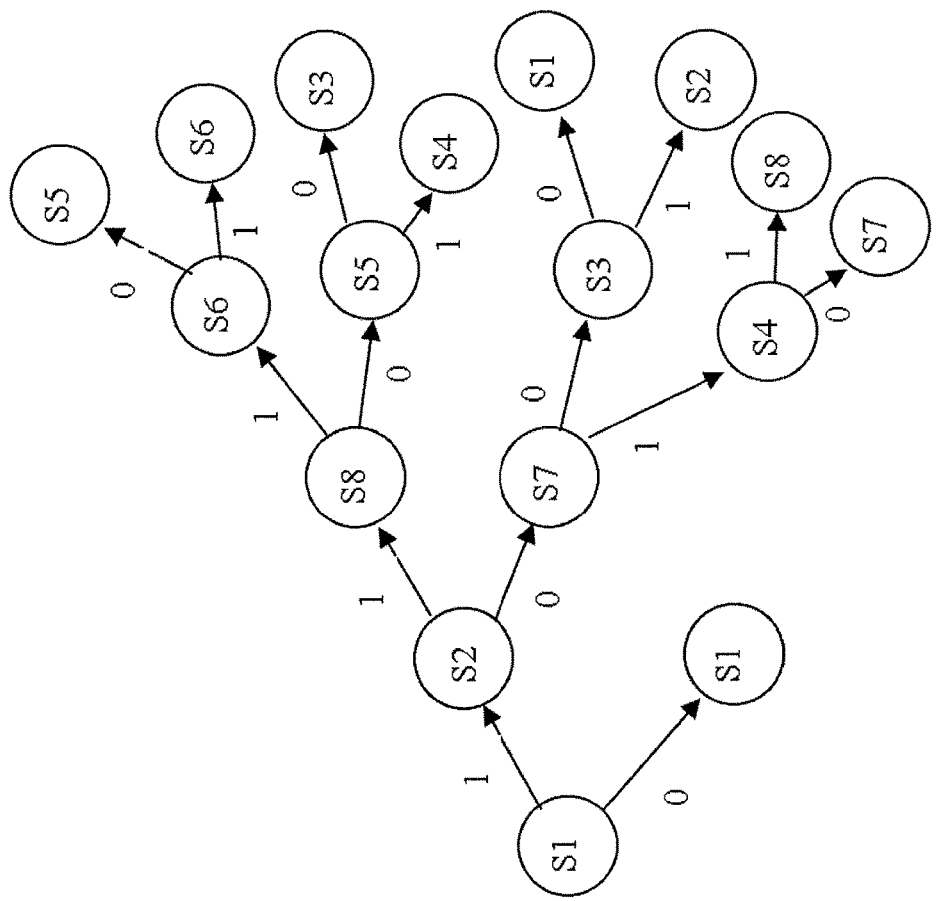

An embodiment of the invention will now be described, by way of example only, with reference to the accompanying drawings in which:

FIG. 1 is a schematic system diagram of a digital radio receiver embodying the invention; and FIG. 2 is a schematic diagram the 'majority vote' feature of some aspects of the invention;

Turning first to FIG. 1 there may be seen a schematic architecture diagram. It may be seen that in the top left-hand corner is the input 2 comprising complex baseband samples representing the signal which is received by the antenna and passes through analogue to digital conversion and appropriate digital filtering stages. The complex baseband signals 2 are fed into a complex rotator block 4 which carries out complex rotation on them to compensate for a carrier frequency offset as estimated by a module 8 (described in more detail below).

The complex baseband input signals 2 are also fed to a estimator module 8 which, as will be explained below, comprises a correlator and which performs timing recovery, frame synchronization and initial frequency offset estimation. There is a corresponding output 10 from this module 8 which is the input to a phase accumulator module 12 that supplies the complex rotator block 4 with the accumulated phase angle needed by this block to carry out complex rotation.

A frequency drift estimator module 14 also provides an input 16 to the phase accumulator module 12 as will also be described in greater detail below.

The waveforms 6 output by the complex rotation block 4 are fed into a matched filter bank 18. There are a total of $2^K$ filters 20 each of K bits length. Thus to take an example where K=3, there would be eight filters 20, each of three bits. The filters 20 are applied to the incoming signals 6 by carrying out a complex multiplication as will be described in greater detail later. The multiplications for each filter 20 are summed in a respective summing stage 22. A further module 24 determines which filter 20 gives the maximum output as given by the magnitude of the complex valued filter output, the index i of which is provided as an input 26 to the majority vote module 28. The same information is also provided as an input 30 to the frequency drift estimator module 14. The actual value of the matching filter output $C_i$ is provided as a further input 32 to the drift estimator 14.

The timing recovery performed by the estimator module 8 provides a strobe output 34 to the maximum output determining module 24 and the majority vote module 28.

The majority vote module 28 determines the best estimate of the next bit based on the K previous filter indices and outputs the finally determined bit from its output 36. Again this process is explained in greater detail below.

The operation of the system set out briefly above will now be described in more detail.

As mentioned before, the incoming signal 2 is passed to the correlator based estimator module 8 for timing recovery, frame synchronization and initial frequency offset estimation.

The correlator included in the module 8 is a data-aided (DA) joint Frame and Frequency estimator which exploits knowledge of the data in the received symbols to cancel the effect of the modulation on the estimate of a conventional delay-and-correlate type of carrier frequency offset estimator. Further details of this estimator and other types of estimator which can be used are given in Chapter 8 of Meyr et al. "Digital Communication Receivers: Synchronization, Channel Estimation and Signal Processing", John Wiley & Sons, Inc 1998.

More specifically, the carrier frequency offset estimator is given by:

$$\Delta \hat{f} = \frac{1}{2\pi DT} \arg\left\{ \sum_{i=0}^{L-1} [z_{n-i} z^*_{n-i-D}] d_i \right\} \quad (1)$$

where L is correlation length, D is a delay (to be explained later), z represents the complex baseband samples (I & Q) and $d_i = p_i^* p_{i+D}$ where p is the samples constituting the upsampled packet synchronization word bits, typically a prefix of the address bits. T is the sample rate period. The correlation length might typically be 128 or 192. In general the correlation length is a trade-off between estimation accuracy and implementation cost. Simulations have indicated that L=128 may be sufficient.

The estimator must be sampled at the right point in time and here the packet detection property (joint timing and frame synchronization) comes into play. Packet detection is achieved when a peak is detected on equation (2) below:

$$M_n = \frac{|C_n|}{P_n}, \text{ where} \quad (2)$$

$$C_n = \sum_{i=0}^{L-1} [z_{n-i} z^*_{n-i-D}] d_i \quad (3)$$

$$P_n = \sum_{i=0}^{L-1} |z_{n-i-D}|^2 \quad (4)$$

It should be noted that the sample time of the packet detection peak serves as timing synchronization. Equations (2) to (4) perform a complex correlation between the complex baseband samples and the samples constituting the up-sampled packet address bits. A valid peak on (2) is qualified by a programmable threshold. This threshold will typically be set in the range 0.7-0.8. It should be noted that equation (4) is used to normalize the magnitude of the correlator peak in equation (2).

Looking at the complex baseband samples and coefficients in equation (1) in polar form it may be rewritten as:

$$\Delta \hat{f} = \frac{1}{2\pi DT} \arg\left\{ \sum_{i=0}^{L-1} [z_{n-i} z^*_{n-i-D} p_i^* p_{i+D}] \right\} \quad (5)$$

$$= \frac{1}{2\pi DT} \arg\left\{ \sum_{i=0}^{L-1} \left[ \begin{matrix} r_{n-i} e^{j(\theta_{n-i}+\varphi_{n-i})} r_{n-i-D} \\ e^{-j(\theta_{n-i-D}+\varphi_{n-i-D})} u_i e^{-j\gamma_i} u_{i+D} e^{j\gamma_{i+D}} \end{matrix} \right] \right\}$$

$$= \frac{1}{2\pi DT} \arg\left\{ e^{j\varphi_\Delta} \sum_{i=0}^{L-1} [r_{n-i} e^{j\theta_{n-i}} r_{n-i-D} e^{-j\theta_{n-i-D}} u_i e^{-j\gamma_i} u_{i+D} e^{j\gamma_{i+D}}] \right\}$$

where {r,u} are the magnitude of the complex numbers. Assuming that the carrier frequency offset is approximately constant, in the above equation $\phi_\Delta$ is the change of phase over D samples.

When "in sync" (i.e. when equation (2) peaks), the sample angles track the coefficient angles ($\theta_{n-i} \approx \gamma_i$) and equation (5) may be rewritten as:

$$\Delta \hat{f} = \frac{1}{2\pi DT} \arg\left\{ e^{j\varphi_\Delta} \sum_{i=0}^{L-1} [r_{n-i} r_{n-i-D} u_i u_{i+D} e^{j(\theta_{n-i}-\theta_{n-i-D})} \cdot e^{-j(\gamma_i-\gamma_{i+D})}] \right\} \quad (6)$$

$$\approx \frac{1}{2\pi DT} \arg\left\{ e^{j\varphi_\Delta} \sum_{i=0}^{L-1} [r_{n-i} r_{n-i-D} u_i u_{i+D}] \right\} = \frac{\varphi_\Delta}{2\pi DT}$$

Taking T=125 ns and D=16, the maximum carrier frequency offset that can be estimated (in either direction) is $$\Delta \hat{f}_{max} \approx \frac{1}{2\pi \cdot 16 \cdot 0.125 \cdot 10^{-6}} \cdot \pi = 250 \text{ kHz}$$

The carrier frequency offset estimate is valid when there is correlation, i.e. when equation (2) peaks. Therefore this estimator jointly estimates carrier frequency offset and timing. Assuming $u_1=1$ it may be seen that the sum in equation (6) evaluates to the energy in the L baseband samples at the time of correlation. This value is normalized with $P_n$ in equation (2) before comparing with a fixed threshold in the range 0.7-0.8. A value of D=16 was chosen in one example although other values could be used. The carrier frequency offset estimator range of +/−250 kHz in this case handles a crystal specification of 50 ppm which is considered sufficient in most applications.

The incoming signals are passed to block 4 to carry out complex rotation using the frequency offset determined above. This is equivalent to the multiplication of the signal by $\cdot e^{-j2\pi\Delta \hat{f} nT}$. The resultant 'compensated' waveform is then passed to the matched filter bank block 18 which carries out bit decisions. Formally, this is so called near optimum (in additive white Gaussian noise) non-coherent maximum likelihood estimation of a bit based on a bank of matched filters matched to all possible bit sequences over an observation interval of length K bits.

In equations, the complex baseband samples z(n) may be written as:

$$z(n) = A(n)e^{j\phi(n)} \tag{1}$$

where the information is in the phase $\phi(n)$. For simplicity the amplitude is assumed to be a constant, A from now on.

Each filter corresponds to a unique K-bit sequence, the complex filter coefficients for filter number i being given by:

$$p_i(n) = e^{j\theta_i(n)}, \tag{2}$$

where the phase angle $\theta_i(n)$ is given by:

$$\theta_i(n) = 2\pi\beta \frac{F_m}{F_s} \sum_{k=0}^{n} S_i(k) \tag{3}$$

where $S_i(k)$ represents the up-sampled bit sequence number i of length KN samples where $i = 0, \ldots, 2^K - 1$. N is the over-sampling factor (number of samples per bit). Furthermore $\beta$ denotes the modulation index, $F_m$ is the frequency of the modulating signal (half the data rate) and $F_s$ is the sampling rate.

The filters produce a complex output at every sample:

$$\begin{aligned} C_i(n) &= \sum_{k=0}^{KN-1} z(n-k) p_i^*(k) \\ &= \sum_{k=0}^{KN-1} A e^{j\varphi(n-k)} e^{-j\theta_i(k)} \\ &= A e^{j(\varphi(n)-\theta_i(0))} + A e^{j(\varphi(n-1)-\theta_i(1))} + \ldots + \\ &\quad A e^{j(\varphi(n-KN+1)-\theta_i(KN-1))} \end{aligned} \tag{4}$$

where $i = 0, \ldots, 2^K - 1$

It should be noted that when timing has been recovered as described earlier, the phase of the complex baseband samples z(n) will approximately track the phase of the filter coefficients for one of the $2^K$ filters with a possible constant phase offset. $\phi, \phi - \theta_i$. Here an insignificant carrier frequency offset may be assumed in light of the frequency offset estimation and correction carried out as described above. or module 8. Furthermore as the phase of the carrier isn't known, the carrier may have an arbitrary initial phase relative to the local oscillator signal.

Assuming synchronized timing, equation (4) becomes:

$$C_i = AKN e^{j\phi_i}, \tag{5}$$

for the filter with the "matching" phase.

At the strobe time (which is decided by timing recovery) the middle bit of the K-bit sequence is selected corresponding to index i where $$i = \max_i |C_i|.$$

For example if i was found to be 5, a zero bit is output since $i = 101_b$, where the middle bit is zero. The magnitude of the complex filter output is computed by computing the square envelope $M = \text{real}(C_i)^2 + \text{imag}(C_i)^2$ using the full multipliers.

As will be appreciated by the skilled person, the bit recovery described above assumes that there is insignificant frequency offset. The approach previously described allows the initial offset to be estimated but it is also important in embodiments to continue to track the frequency offset throughout the reception of a packet. One reason for this is that in practice the initial frequency offset estimation from the correlator module 8 will inevitably have some residual error. Another reason is that there is typically some frequency drift between a transmitter and the receiver during reception of a packet. Thus performing frequency drift compensation will prevent the performance advantage which can be achieved by using a matched filter bank from being quickly diminished.

In accordance with the embodiment of the invention described herein successive observations of the phase information from the matched filter bank 18 (after controlling for the modulation effect) are used to track frequency offset.

With reference to equations (4) and (5) observing the phase for filter number i at sample time n this filter produces:

$$C_i(n) = AKN e^{j\phi_i(n)}$$

Then at sample time $n + \Delta t$ where $\Delta t = kN$ for some integer k and N is the number of samples per bit, a new observation of the same filter is made. This yields two phase observations spaced in time for filter number i that may be utilized to estimate frequency offset as follows:

$$\Delta \hat{f}_{res} = \frac{F_s}{2\pi} \cdot \frac{\phi_i(n+kN) - \phi_i(n)}{kN} \tag{6}$$

The phase is obtained by computing the arctan( ) of the complex filter output. This is accomplished by a CORDIC block running in vector mode. It is assumed that timing is synchronized, that is the drift estimator block 14 is employed after timing synchronization.

In the above equations the modulation effect on the phase of the complex baseband samples was disregarded. For this estimate in equation (6) to be valid it requires that there were an equal number of 1s and 0s observed between two phase observations. This is accomplished by logging the time stamp and phase for the filter selected for each bit period and the difference in the number of 1s and 0s encountered so far. Then, next time a matched filter is selected, the last phase value for this filter is read as well as the last time stamp for the filter. Thus to avoid errors caused by the modulation, a requirement is set that the current difference in numbers of 1s and 0s matches the last value stored. This leads to computing the phase difference and dividing by the time distance $\Delta t$ in number of samples to get a frequency offset estimate according to equation (6). This value is then filtered in a first order infinite impulse response (IIR) filter before $\Delta \hat{f}$ is updated in the phase accumulator module 12.

Thus far have been described the correlator based estimator for frequency offset compensation and a matched filter bank with the phases of the matched filters being used to calculate frequency drift. In a refinement of the matched filter bank which is advantageous although not essential in all embodiments a 'majority vote' module 28 is used to make statistically improved bit determinations as will be described below.

The 'majority vote' module 28 utilizes the fact that more than one observation of each bit is available. For example where K=3 there are potentially three observations of the same bit available by looking at the history of the three most recent matched filter state transitions. By looking at three columns successively over three state transitions, each will suggest a bit determination such that the most common—i.e. the one which is suggested on two or three of the transitions—can be selected as the 'majority vote' before bit slicing.

Reference is now made to FIG. 2 for further explanation. This shows the eight matched filters S1 . . . S8 and corresponding bit sequences 38 for a K=3 system. Assuming that bits enter the filters from the right, ideal state transitions are shown in the diagram on the right of FIG. 2. To illustrate the operation an example will be given.

It is first assumed that the filter just selected was S1. In the next bit interval, a '1' enters the filter bank. Consequently, the most likely filter match would be S2, followed by S7 if the next bit is a '0' or S8 if the next bit is a '1'. There are of course 'return' branches in reality but these are not shown for the sake of clarity.

Although FIG. 2 shows the all the theoretical transitions, in practice when the effect of noise is taken into account other 'forbidden' transitions may take place. For instance there may be a transition from S2→S5→S3 which is interpreted as a '1' travelling from right to left. In this case all three filters 'agree' about the value of the bit: i.e. the rightmost bit of S2 is '1', the middle bit of S5 is '1' and the leftmost bit of S3 is '1' too.

In another possible case the transition might be S2→S4→S3. Here the corresponding bits of the three filters do not all agree: the rightmost bit of S2 is '1' and so is the leftmost bit of S3; however the middle bit of S4 is '0' and hence there is disagreement. However under the majority vote principle, since two of the filters agree on the bit being '1', the bit is output as a '1' to the output 36.

The principle is illustrated with K=3 and it will be appreciated that is the minimum filter-order where this type of observation averaging is effective. Of course other filter orders could be used such as K=5, K=7 etc. which would be expected to give better results but at the cost of increased implementation complexity. Of course intermediate even-order filter schemes of K=4,6 etc. could be used—e.g. by skipping one observation to break tied votes.

It will be appreciated by those skilled in the art that the embodiment of the invention described above has significant potential advantages. However many variations and modifications are possible within the scope of the invention. In particular it is mot essential to employ all of the majority vote feature, the correlator based estimator for frequency offset estimation and the phase information from the MFB for frequency drift estimation; only one or two of these features may be used in conjunction with an MFB.

The invention claimed is:

1. A digital radio receiver adapted to receive radio signals modulated using continuous phase frequency shift keying, the receiver comprising a radio reception portion for receiving an analogue radio signal having a carrier frequency, a correlator arranged to estimate a frequency offset between said carrier frequency and a nominal carrier frequency, a correction portion for correcting for said frequency offset and a matched filter bank (MFB) comprising a plurality of filters each of which corresponds to a different bit pattern for determining a bit sequence from said analogue radio signal, wherein the digital radio receiver further comprises a drift estimator arranged to estimate a frequency drift in said carrier signal by comparing a phase determined by a given filter of the MFB when it is the matched filter with the phase determined on a subsequent matching occasion after a period in which there are an equal number of high and low bits received, said receiver being arranged to record the phase with a timestamp each time a filter is matched, and the next time said filter is matched, to perform a check to see whether an equal number of high and low bits has been identified since the previous match.

2. The digital radio receiver as claimed in claim 1 wherein the correlator is a Joint Frame and Frequency offset data-aided estimator.

3. The digital radio receiver as claimed in claim 1 arranged to make a frequency drift estimate each time a filter is matched and there is an equal number of high and low bits received.

4. The digital radio receiver as claimed in claim 1 arranged to apply a correction to said carrier frequency based on said drift estimate.

5. The digital radio receiver as claimed in claim 4 arranged to apply said correction only if it is above a predetermined minimum and/or below a predetermined maximum.

6. The digital radio receiver as claimed in claim 1 arranged to use the K most recent bit observations of each bit to make a bit decision, where K is the number of bits per filter.

7. A digital radio receiver adapted to receive radio signals modulated using continuous phase frequency shift keying, the receiver comprising a radio reception portion for receiving an analogue radio signal having a carrier frequency, a correlator arranged to estimate a frequency offset between said carrier frequency and a nominal carrier frequency, a correction portion for correcting for said frequency offset and a matched filter bank (MFB) comprising a plurality of filters each of which corresponds to a different bit pattern for determining a bit sequence from said analogue radio signal, wherein the digital radio receiver further comprises a drift estimator arranged to estimate a frequency drift in said carrier signal by comparing a phase determined by a given filter of the MFB when it is the matched filter with the phase determined on a subsequent matching occasion after a period in which there are an equal number of high and low bits received, said receiver being arranged not to estimate said frequency drift if said period exceeds a threshold time.

8. A digital radio receiver adapted to receive radio signals modulated using continuous phase frequency shift keying, the receiver comprising a radio reception portion for receiving an analogue radio signal having a carrier frequency, a correlator arranged to estimate a frequency offset between said carrier frequency and a nominal carrier frequency, a correction portion for correcting for said frequency offset and a matched filter bank (MFB) comprising a plurality of filters each of which corresponds to a different bit pattern for determining a bit sequence from said analogue radio signal, wherein the digital radio receiver further comprises a drift estimator arranged to estimate a frequency drift in said carrier signal, said receiver being arranged to apply a correction to said carrier frequency based on said drift estimate only if a predefined minimum time has elapsed since the last correction was applied.

9. A digital radio receiver adapted to receive radio signals having a carrier frequency and modulated using continuous phase frequency shift keying, the receiver comprising a radio reception portion for receiving said radio signal, and a matched filter bank (MFB) comprising a plurality of filters each of which corresponds to a different bit pattern for determining a bit sequence from said signal, wherein the receiver is arranged to:

obtain information from one of said filters relating to a phase of said signal when said filter is matched to a bit pattern on a first occasion;

obtain information from said filter relating to a phase of said signal when said filter is matched to the bit pattern on a second occasion; and estimate a frequency drift of said carrier frequency using a difference in phase between the phase determined on the first occasion and the phase determined on the second occasion if said bit sequence between said first and second occasions comprises an equal number of high and low bits.

10. The digital radio receiver as claimed in claim 9 arranged to make a frequency drift estimate each time a filter is matched and there is an equal number of high and low bits received.

11. A method of decoding a radio signal modulated using continuous phase frequency shift keying comprising:

receiving an analogue radio signal having a carrier frequency;

using a correlator to estimate a frequency offset between said carrier frequency and a nominal carrier frequency;

correcting for said frequency offset;

using a matched filter bank (MFB) comprising a plurality of filters each of which corresponds to a different bit pattern to determine a bit sequence from said analogue radio signal;

estimating said frequency drift by comparing a phase determined by a given filter of the MFB when it is the matched filter with the phase determined on a subsequent matching occasion after a period in which there are an equal number of high and low bits received; and recording the phase with a timestamp each time a filter is matched; and the next time said filter is matched, perform a check to see whether an equal number of high and low bits has been identified since the previous match.

12. The method as claimed in claim 11 wherein the correlator is a Joint Frame and Frequency offset data-aided estimator.

13. A method of estimating a frequency drift in a radio signal modulated using continuous phase frequency shift keying, the method comprising:

receiving said radio signal having a carrier frequency;

determining a bit sequence from said radio signal using a matched filter bank comprising a plurality of filters each of which corresponds to a different bit pattern;

obtaining information from one of said filters relating to a phase of said signal when said filter is matched to a bit pattern on a first occasion;

obtaining information from said filter relating to a phase of said signal when said filter is matched to the bit pattern on a second occasion; and estimating a frequency drift of said carrier frequency using a difference in phase between the phase determined on the first occasion and the phase determined on the second occasion if said bit sequence between said first and second occasions comprises an equal number of high and low bits.

14. The method as claimed in claim 13 comprising making a frequency drift estimate each time a filter is matched and there is an equal number of high and low bits received.

15. A method of decoding a radio signal modulated using continuous phase frequency shift keying comprising:

receiving an analogue radio signal having a carrier frequency;

using a correlator to estimate a frequency offset between said carrier frequency and a nominal carrier frequency;

correcting for said frequency offset;

using a matched filter bank (MFB) comprising a plurality of filters each of which corresponds to a different bit pattern to determine a bit sequence from said analogue radio signal;

estimating a frequency drift by comparing a phase determined by a given filter of the MFB when it is the matched filter with the phase determined on a subsequent matching occasion after a period in which there are an equal number of high and low bits received; and not estimating said frequency drift if said period exceeds a threshold time.

16. A method of decoding a radio signal modulated using continuous phase frequency shift keying comprising:

receiving an analogue radio signal having a carrier frequency;

using a correlator to estimate a frequency offset between said carrier frequency and a nominal carrier frequency;

correcting for said frequency offset;

using a matched filter bank (MFB) comprising a plurality of filters each of which corresponds to a different bit pattern to determine a bit sequence from said analogue radio signal;

estimating a frequency drift by comparing a phase determined by a given filter of the MFB when it is the matched filter with the phase determined on a subsequent matching occasion after a period in which there are an equal number of high and low bits received; and applying a correction to said carrier frequency based on said drift estimate correction only if a predefined minimum time has elapsed since the last correction was applied.

* * * * *